United States Patent
Nadalin et al.

(10) Patent No.: US 8,683,545 B2
(45) Date of Patent: Mar. 25, 2014

(54) FEDERATING POLICIES FROM MULTIPLE POLICY PROVIDERS

(75) Inventors: Anthony J. Nadalin, Austin, TX (US); Nataraj Nagaratnam, Cary, NC (US); Sridhar R. Muppidi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 12/192,769

(22) Filed: Aug. 15, 2008

(65) Prior Publication Data

US 2010/0043050 A1    Feb. 18, 2010

(51) Int. Cl.
  *G06F 21/00* (2013.01)
(52) U.S. Cl.
  USPC .................................. 726/1; 726/6
(58) Field of Classification Search
  USPC .................................. 726/1, 3, 8, 6
  See application file for complete search history.

(56) References Cited

U.S. PATENT DOCUMENTS

| | | | |
|---|---|---|---|
| 6,580,916 B1 * | 6/2003 | Weisshaar et al. | 455/456.1 |
| 7,316,027 B2 * | 1/2008 | Burch et al. | 726/1 |
| 7,346,923 B2 * | 3/2008 | Atkins et al. | 726/6 |
| 7,562,382 B2 * | 7/2009 | Hinton et al. | 726/2 |
| 7,665,118 B2 * | 2/2010 | Mann et al. | 726/1 |

* cited by examiner

*Primary Examiner* — Jung Kim
*Assistant Examiner* — Thomas Ho
(74) *Attorney, Agent, or Firm* — Patents On Demand P.A.; Brian K. Buchheit; Scott M. Garrett

(57) ABSTRACT

One aspect of the present invention can include a system, a method, a computer program product and an apparatus for federating policies from multiple policy providers. The aspect can identify a set of distinct policy providers, each maintaining at least one policy related to a service or a resource. A federated policy exchange service can be established that has a policy provider plug-in for each of the distinct policy providers. The federated policy exchange service can receive requests for policies from a set of policy requesters. Each request can include a resource_id or a service_id used to uniquely identify the service or resource. The federated policy exchange service can dynamically connect to a set of the policy providers to determine policies applicable to each request. For each request, results from the policy providers can be received and processed to generate a response. The federated policy exchange service can provide the response to each policy requestor responsive in response to each response.

18 Claims, 2 Drawing Sheets

FEDERATING POLICIES FROM MULTIPLE POLICY PROVIDERS

BACKGROUND OF THE INVENTION

The present invention relates to Web Service policies, and more particularly, to federating policies from multiple policy providers.

Web services are self-contained pieces of programmatic logic that communicate externally through XML based messaging, typically in conformance with a SOAP protocol. Web services are often defined through languages such as WSDL and are registered within one or more registries, such as a Universal Description, Discovery, and Integration (UDDI) registry. Every Web service is associated with one or more policies, which can be defined as a set of assertions (rules, requirements, obligations) that define properties of a contract of a Web service based communication. Web service policies define an interface for the Web services (typically defined using WSDL in a UDDI directory), define a format of a message payloads of the Web service (typically defined using WSDL in a UDDI directory), and/or define other behavior requirements of the Web service. Some of the behavior requirements (policies) of Web service relate to ensuring an established Quality of Service (QoS), others relate to monitoring the Web service performance, others to security considerations for the Web service, still others relate to defining and enforcing business goals and/or logic.

Representational state transfer (REST) is a style of software architecture for distributed hypermedia systems such as the World Wide Web. The terms "representational state transfer" and "REST" were introduced in 2000 in the doctoral dissertation of Roy Fielding, one of the principal authors of the Hypertext Transfer Protocol (HTTP) specification. The terms have since come into widespread use in the networking community. REST strictly refers to a collection of network architecture principles which outline how resources are defined and addressed. The term is often used in a looser sense to describe any simple interface which transmits domain-specific data over HTTP without an additional messaging layer such as SOAP or session tracking via HTTP cookies.

Policy enforcement/access points exist in a runtime environment that are configured to support Web services. These enforcement or access points are nodes of a runtime environment which are configured to ascertain specifics of one or more Web service policies, to apply suitable programmatic logic to enforce the policy, and/or to enact a programmatic action based upon one or more defined policies.

A challenge with Web service policies is that there are often many different policy providing domains (security, routing, monitoring, etc.), and not all of these domains are centralized. For example, access control policies can be contained in an access manager, such as IBM TIVOLI ACCESS MANAGER. Routing policies can be defined within a registry repository, such as WEBSPHERE SERVICE REGISTRY AND REPOSITORY (WRSS). Monitoring policies can be contained in an application management component, such as IBM TIVOLI COMPOSITE APPLICATION MANAGEMENT (ITCAM). For an enforcement point and/or access point to be aware of all policies to be applied to a Web service, multiple policy providers must be queried.

Numerous efforts for establishing metadata repositories (e.g., WSRR, TIVOLI CHANGE AND CONFIGURATION MANAGEMENT DATABASE (CCMDB), TIVOLI FEDERATED IDENTITY MANAGER (TFIM), etc.) have been attempted and are in existence. While these efforts have each yielded beneficial results in many ways, none have resolved problems with effectively federating policies. One reason for this is that previous efforts for federating policies assume that there is a single point/location/registry where all policies are registered. Each currently existing policy provider (WSRR, CCMDB, TFIM, etc.), however, addresses numerous concerns relating to Web services in different ways, which to this point has prevented policies from being centrally registered. These specific concerns are important for the various components to perform their individual roles (i.e., security for TAM, monitoring for ITCAM, etc.).

It should be noted that the policy providers detailed above are all components of a common architecture or solution for Web services (e.g., are IBM-centric components). Other architectures exist, each having an architecture specific set of policy providers. Additionally, policies are currently defined by policy providers using numerous largely incompatible languages; some having an approach of defining policies as instances (e.g., Web Services Policy Language); others having an approach of expressing policies as classes (OWL-DL). In light of the above, no unification of Web service policies into a single "master" repository is expected in the near future, if ever. At the same time, no known solution exists for unifying or federating policy data from multiple policy providers.

FIG. 1 (prior art) illustrates a current situation regarding Web services and their policies. At present access/enforcement points 112 can receive services/resource 122 from a resource server 120. An access point 112 can consist of one or more users 114 interacting with a client 116 that utilizes the service/resource 122. An enforcement point 112 can include a software agent executing on a computing device (116) that utilizes the service/resource 122. Each of the resources/services 122 have a number of associated policies 126 stored in different data stores 128. Any entity/data store 128 that stores resource policies 126 can be generically referred to as a policy provider. The policy providers 128, resource server(s) 120, and access/enforcement points 112 can each be connected via a network 118. Resource servers 120, access points 112, policy enforcement points each have to query multiple different policy providers 128 to determine relevant policies 126 applicable to a given service/resource, which results in synchronization problems and inconsistent policy application as previously noted.

BRIEF SUMMARY OF THE INVENTION

One aspect of the present invention can include a system, a method, a computer program product and an apparatus for federating policies from multiple policy providers. The aspect can identify a set of distinct policy providers, each maintaining at least one policy related a Web service or a resource. A federated policy exchange service can be established that has a policy provider plug-in for each of the distinct policy providers. The federated policy exchange service can receive requests for policies from a set of policy requesters. Each request can include a resource_id or a service_id used to uniquely identify the service or resource. The federated policy exchange service can dynamically connect to a set of the policy providers to determine policies applicable to each request. For each request, results from the policy providers can be received and processed to generate a response. The federated policy exchange service can provide the response to each policy requestor responsive in response to each response.

Another aspect of the present invention can include a system for federating Web service policies. The system can include a set of policy providers, a federated policy server, and a set of policy requesters. The set of policy providers can each manage at least one policy for a Web service. The federated policy server can include a set of provider interface modules, one for interfacing with each of the policy providers. The federated policy server can accept policy requests, can lookup matching policies for the requests within policy stores maintained by the plurality of policy providers, and can provide responses to the policy requests based upon lookup results. The policy requesters can utilize the federated policy server for policies related to at least one Web service.

DETAILED DESCRIPTION OF THE INVENTION

Figure 1:
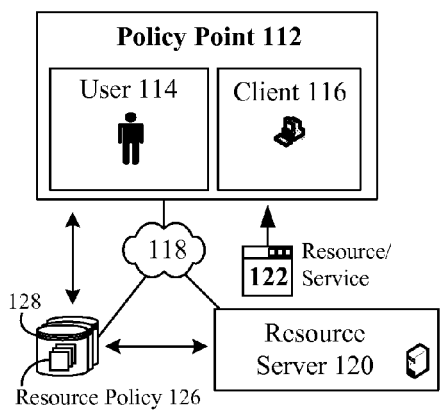
FIG. 1 (Prior art) illustrates a runtime environment in which Web service policies are managed and utilized.
Figure 2:
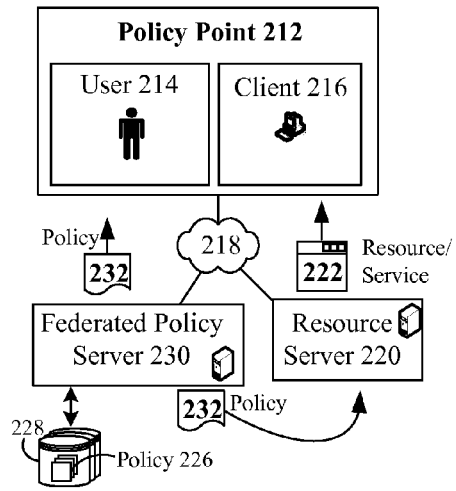
FIG. 2 illustrates a runtime environment in which Web service policies are federated in accordance with an embodiment of the inventive arrangements disclosed herein.

The present invention provides a solution where a federated policy server 230 federates policy 226 data from multiple policy providers 228, as shown in FIG. 2. The server 230 can be connected to one or more resource servers 220 and one or more access/enforcement points 212 via a network 218 in runtime environment 210. Access/enforcement points 212 and resource servers 220 can query the federated policy server 230 and receive all policies 232 applicable to a given service/resource 222. This negates a need to individually query multiple policy providers 228 and solves issues associated with policy synchronization and inconsistent policy enforcement.

Figure 3:
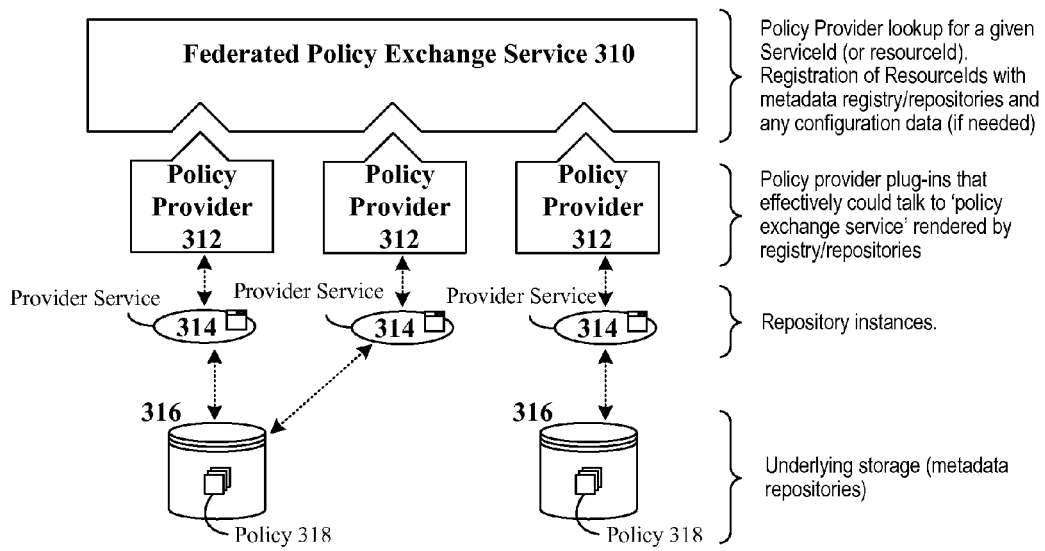
FIG. 3 illustrates a federated policy exchange service in accordance with an embodiment of the inventive arrangements disclosed herein.

The federation policy server 230 can federate policies 226, as shown in FIG. 3. That is, the federation policy server 230 can execute a federated policy exchange service 310, which provides a policy provider lookup service based upon a unique service/resource identifier. The federated policy exchange service 310 can include multiple policy provider plug-ins 312. Each plug-in 312 can permit the federated policy change service to exchanged information with a plug-in 312 specific provider services 314, which can be repository instances. Each of the provider services 314 can be linked to an underlying storage repository 316 within which policy information 318 is stored. The plug-in 312 can include conversion, reformatting, transcending instructions that permit the federated policy exchange service 310 to handle the policies in a unified manner.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can store the program for use by or in connection with the instruction execution system, apparatus, or device.

Any suitable computer usable or computer readable medium may be utilized. The computer-usable or computer-readable medium may be, for example but not limited to, an electronic, magnetic, optical, electromagnetic, infrared, or semiconductor system, apparatus, or device. Examples of a computer-readable medium include a semiconductor or solid state memory, magnetic tape, a removable computer diskette, a random access memory (RAM), a read-only memory (ROM), an erasable programmable read-only memory (EPROM or Flash memory), a rigid magnetic disk and an optical disk. Current examples of optical disks include compact disk-read only memory (CD-ROM), compact disk-read/write (CD-R/W) and DVD.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 4:
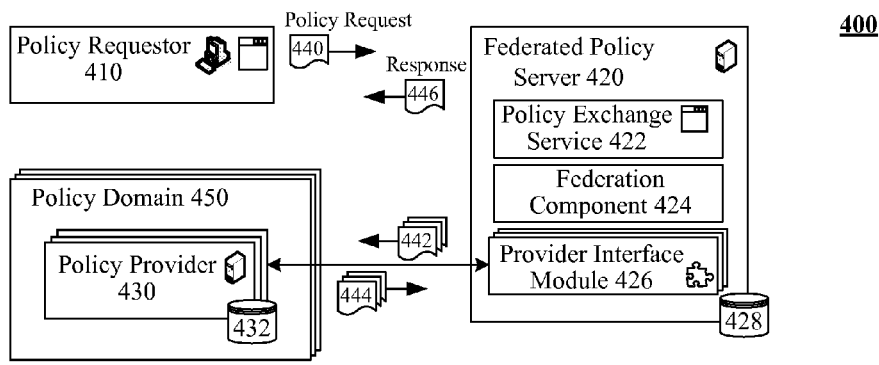
FIG. 4 is a schematic diagram of a system for a federated policy server that provides requesters Web service policies, which are registered within multiple discrete repositories in accordance with an embodiment of the inventive arrangements disclosed herein.

FIG. 4 is a schematic diagram of a system for a federated policy server 420 that provides requestors 410 Web service policies, which are registered within multiple discrete repositories in accordance with an embodiment of the inventive arrangements disclosed herein. The system 400 of FIG. 4 is consistent with expressions of the invention presented in FIG. 2 and FIG. 3.

In system 400, the federated policy server 420 can provide a policy exchange service 422, which requestors 410 can utilize to determine any policy of a Web service, resource, or other object, regardless of policy domain 450. Federated policy server 420 can include multiple provider interface modules 426. Each module 426 can permit the server 420 to interface with a specific policy provider 430. The module 426 can convert format of policy 444 information provided by a provider 430 to a standardized one used by the policy server 420. In one embodiment, the federated policy server 420 need not locally (using data store 428) maintain policy data, but can dynamically acquire it from remotely located data stores 432 maintained by policy providers 430. In another embodiment, the server 420 can locally maintain a portion of policy information in a local data store 428.

Any data acquisition technology (e.g., subscription, polling, etc.) can be used when exchanging information 442, 444 between the federation policy server 420 and the policy providers 430 and when exchanging information 440, 446 between the policy requester 410 and the server 420. In a typical transaction, a policy requester 410 can convey a policy request 440 to the federated policy server 420. The request 440 can request one or more policies (up to all) of a Web service, resource, or other object. The policy server 420 can submit suitably formatted requests 442 to one or more policy providers 430 resulting in responses 444. These responses 444 are processed by the federation component 424 and converted into response 446, which is sent to the policy requester 410. Importantly, the policy requester 410 can submit any type of policy request 440 to the federated policy server 420 without needing to know which policy provider(s) 430 maintains policies of the requested type. In one embodiment, a published policy exchange service 422 can be used to interface with the policy requestors 410.

As used herein, a policy is an interface that defines a condition applied to a Web service, resource, or information. Policies can include behavioral requirements, format requirements, Quality of Service (QoS) requirements, business requirements, security requirements, monitoring requirements, and the like.

The policy provider 430 is an entity that exposes one or more policies related to a Web service, resource, or information. For example, policy providers 430 can include a WEBSPHERE APPLICATION SERVER (WAS), a DATAPOWER server, a TIVOLI ACCESS MANAGER (TAM) server, a .NET server, IBM TIVOLI COMPOSITE APPLICATION MANAGEMENT (ITCAM) server, an IBM Tivoli Management Framework (TFM) component, a WEBSPHERE SERVICE REGISTRY AND REPOSITORY (WRSS), a TIVOLI CHANGE AND CONFIGURATION MANAGEMENT DATABASE (CCMDB), a Universal Description, Discovery, and Integration (UDDI) registry, and the like.

A policy domain 450 can contains policy sets, management classes, and copy groups. Policy domains 450 are enforced by numerous servers, such as WS-security server. The federated policy server 420 can interact across different policy domains 450.

A policy requestor 410 can be any entity that request a policy from the federated policy server 420. For example, a policy requestor 410 can include a policy point, which can be a point in a service oriented architecture (SOA) that enforces, monitors, and/or takes other programmatic action involving a resource/service based upon a preexisting policy. The policy requester 410 can include a management system, a service registry, and/or an access point utilizing a Web service.

Data exchanged 440-446 in system 400 can be conveyed over a network. The network can include any hardware, software, and firmware necessary to convey data encoded within carrier waves. Data can be contained within analog or digital signals and conveyed though data or voice channels. The networks can include local components and data pathways necessary for communications to be exchanged among computing device components and between integrated device components and peripheral devices. The networks can also include network equipment, such as routers, data lines, hubs, and intermediary servers which together form a data network. The networks can further include circuit-based communication components and mobile communication components, such as telephony switches, modems, cellular communication towers, and the like. Additionally, the networks can include line based and/or wireless communication pathways.

The data stores 428, 432 can be a physical or virtual storage repository configured to store digital information. The data stores 428, 432 can be physically implemented within any type of hardware including, but not limited to, a magnetic disk, an optical disk, a semiconductor memory, a digitally encoded plastic memory, a holographic memory, or any other recording medium. Each of data stores 428, 432 can be a stand-alone storage unit as well as a storage unit formed from one or more physical devices. Additionally, information can be stored within the data stores 428, 432 in a variety of manners. For example, information can be stored within a database structure or can be stored within one or more files of a file storage system, where each file may or may not be indexed for information searching purposes. Further, the data stores 428, 432 can optionally utilize one or more encryption mechanisms to protect stored information from unauthorized access.

Figure 5:
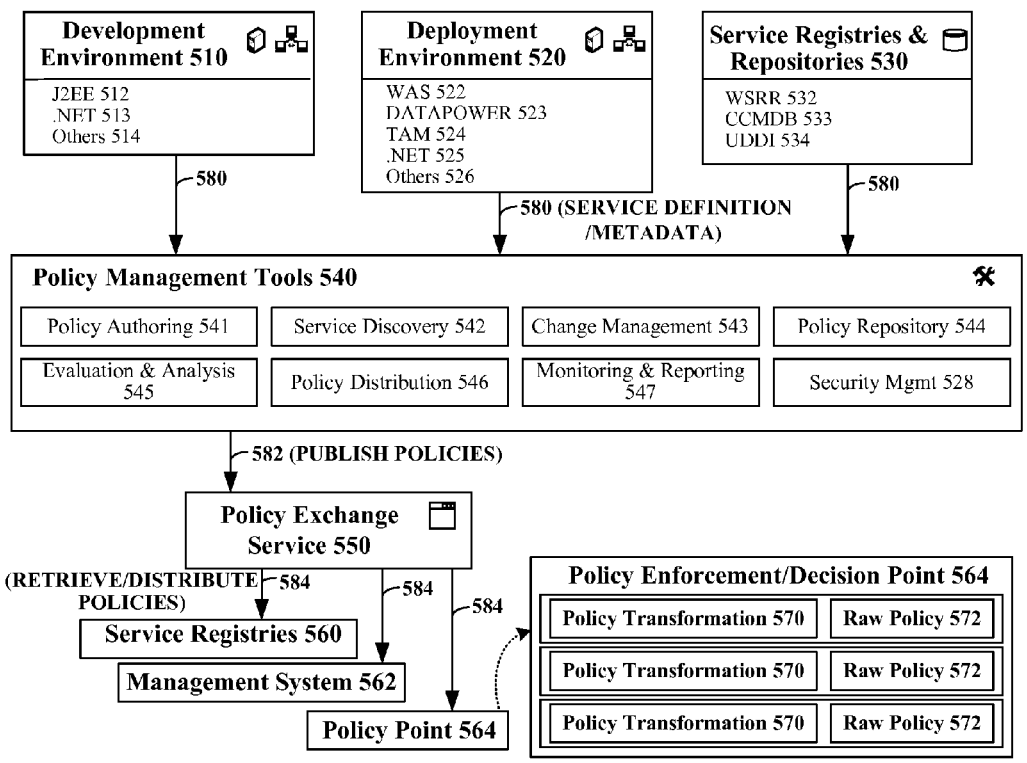
FIG. 5 is a schematic diagram of an architecture for federating policy data registered and maintained within different repositories in accordance with an embodiment of the inventive arrangements disclosed herein.

FIG. 5 is a schematic diagram of an architecture 500 for federating policy data registered and maintained within different repositories in accordance with an embodiment of the inventive arrangements disclosed herein.

In architecture 500, service definition/metadata 580 regarding policies can be federated using a set of policy management tools 540. The policy data 580 can be acquired from one or more development environment 510, from one or more deployment environments 520, and/or from a set of service registries and repositories 530.

The policy management tools 540 can federate data 580 from different policy sources 510, 520, 530 regardless of platform specific considerations in a platform independent manner. For example the development environment 510 can be a JEER based 512, a .NET 513 based, or other 514 computing environment and still be supported by tools 540. Similarly, different types of deployment environments 520, such as a WAS 522 environment, a DATAPOWER 523 environment a TAM 524 environment, a .NET environment 525, and any other deployment environment 526, can be supported. Policy data 580 registered within different repositories, such as WRSS 532, CCMDB 533, and a Universal Description, Discovery, and Integration (UDDI) registry 534, can also be handled.

The policy management tools 540 can include policy authoring tools 541, service discovery tools 542, change management tools 543, policy repository tools 544, evaluation and analysis tools 545, policy distribution tools 546, monitoring and reporting tools 547, service management tools 528, and the like. One or more federated policy servers (e.g., server 420) can provide the tools 540.

Policies can be published 582 to a policy exchange service 550. In one embodiment, the policy exchange service 550 can be a Web service that federates policy data about other Web services. Service 550 can be utilized to retrieve and/or distribute policies 548 to service registries 560 (e.g., WARS, CCMDB, etc.), to management systems 562 (e.g., TAM, ITCAM, etc.), and to policy points 564.

A policy point 564 can include a policy enforcement point (PEP), a policy decision point (PEP), and any other point that desires to access a Web service policy. Each policy provided by the service 550 can include a policy transformation 570 and a raw policy 572. For example, the raw policy 572 can be a DATAPOWER 523 policy from a deployment environment 520 where the policy transformation 570 is specific to DATAPOWER and implemented using a DATAPOWER specific interface module (e.g., module 426 from system 400). In another example, the raw policy 572 can be a WAS policy having a WAS specific transformation 570 applied to it. Still another policy provided to a point 564 can be a TAM policy (raw policy 572) having a TAM specific transformation 570.

The diagrams in FIGS. 2-5 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for federating policies from multiple policy providers comprising:

at least one computing device identifying a plurality of distinct policy providers, each maintaining at least one policy for a Web service, wherein each policy is a condition or requirement of the Web service, wherein a first one of the distinct policy providers provides a quality of Service (QoS) policy for the Web service, wherein a second one of the distinct policy providers provides a policy for a monitoring requirement for the Web service, wherein a third one of the distinct policy providers provides a policy for a security requirement for the Web service, wherein the first one, the second one, and the third one of the distinct policy providers are different runtime environment entities supporting operation of the Web service, wherein the first one, the second one, and the third one of the distinct policy providers are independent of one another;

at least one computing device establishing a federated policy exchange service of a federated policy server having a policy provider plug-in for each of the distinct policy providers, wherein the federated policy server is independent of any of the distinct policy providers;

the federated policy exchange service, which is a Web service that federates policy data about other Web services, receiving requests for policies from a plurality of policy requesters, wherein each request comprises a service_id used to uniquely identify the Web service;

the federated policy exchange service dynamically connecting to a plurality of the policy providers to determine policies applicable to each of the requests, wherein the determined policies for the requests comprise the Quality of Service policy, a policy for the monitoring requirement, and a policy for the security requirement;

the federated policy exchange service receiving results comprising policies from the policy providers;

the federated policy exchange service determining the results applicable to each of the requests;

the federated policy exchange service processing the results to generate a response; and the federated policy exchange service providing the response to each policy requester responsive to each of the requests, wherein the response satisfies the Quality of Service policy, the policy for the monitoring requirement, and the policy for the security requirement.

2. The method of claim 1, wherein the plurality of distinct policy providers maintain a policy for business requirements of the Web service.

3. The method of claim 1, wherein the policies are transformed runtime utilizing a transformation included within each of the policies.

4. The method of claim 1, wherein the plurality of distinct policy providers maintain a policy for behavioral requirements of the Web service.

5. The method of claim 1, wherein said requestors comprise at least one service registry, at least one management system, and at least one policy point.

6. The method of claim 1, wherein different ones of the policy providers comprise a provider disposed in a development environment, a provider disposed in a deployment environment, and a provider that is a service registry, wherein the Web service has different constraints depending on whether it is required to execute within the development environment or the deployment environment as defined by the policies handled by the federated policy exchange service.

7. A computer program product for federating service policies comprising:

a non-transitory computer usable storage medium having computer usable program code embodied therewith, the computer usable program code comprising:

computer usable program code to accept policy requests;

computer usable program code to lookup matching policies for the requests within policy stores maintained by the plurality of different policy providers, wherein different ones of the policy providers belong to different policy domains, wherein each of the different policy domains are enforced and maintained by different independent servers;

computer usable program code to receive results comprising policies from the policy providers, wherein each of the policies is a condition or requirement of a Web service, wherein a first one of the different policy providers provides a quality of Service (QoS) policy for the Web service, wherein a second one of the different policy providers provides a policy for a monitoring requirement for the Web service, wherein a third one of the different policy providers provides a policy for a security requirement for the Web service, wherein the first one, the second one, and the third one of the different policy providers are different runtime environment entities supporting operation of the Web service, wherein the first one, the second one, and the third one of the different policy providers are independent of one another;

computer usable program code to determine the policies applicable to each of the requests;

computer usable program code to process the policies to generate responses; and computer usable program code to provide responses to the policy requests based upon lookup results, wherein the different providers comprise a provider disposed in a development environment, a provider disposed in a deployment environment, and a provider that is a service registry, wherein the Web service has different constraints depending on whether it is required to execute within the development environment or the deployment environment as defined by the policies.

8. The computer program product of claim 7, further comprising: a plurality of policy provider plug-ins, one for each of the different policy providers, wherein each of the plug-ins permit a federated policy exchange service to communicate with an application instance of a corresponding policy provider, wherein the application instance is communicatively linked to an underlying storage repository comprising a plurality of policies, wherein the federated policy exchange service is a Web service that federates policy data about other Web services.

9. The computer program product of claim 7, wherein the policy providers comprise at least one security policy server, at least one monitoring policy server, and at least one service repository.

10. The computer program product of claim 7, wherein said policy requestors comprise at least one service registry, at least one management system, and at least one policy point.

11. A system for federating service policies comprising: a plurality of policy providers each configured to manage at least one policy for a service;

a federated policy server, comprising one or more processors executing programmatic instructions stored on a non-transitory storage medium, wherein the federated policy server comprises a plurality of provider interface modules, comprising at least a portion of the programmatic instructions, one for interfacing with each of the policy providers, wherein different ones of the policy providers belong to different policy domains, wherein the federated policy server is configured to accept policy requests, to lookup matching policies for the requests within policy stores maintained by the plurality of policy providers, to obtain results comprising policies from the policy providers based upon the lookup, to determine the results applicable to each request, to convert format of the received result in a suitable formatted response for each policy request, and to provide responses to the policy requests, wherein each of the policies maintained in the different policy domains comprise is a condition or requirement of a Web service, wherein one of the policies is a Quality of Service (QoS) policy for the Web service, wherein another of the policies is a policy for a monitoring requirement for the Web service, wherein another of the policies is a policy for a security requirement for the Web service.

12. The system of claim 11, further comprising: a plurality of policy requesters each configured to utilize the federated policy server for policies of the Web service.

13. The system of claim 11, wherein the policy providers comprise at least one security policy server, at least one monitoring policy server, and at least one service repository, wherein the security policy server provides the security policy of the Web service, wherein the monitoring policy service maintains the policy for the monitoring requirement of the Web service.

14. The system of claim 11, wherein the federated policy server provides a federated policy exchange service, which is a Web service that federates policy data about other Web services.

15. The system of claim 11, wherein the federated policy server comprises a policy authoring component, a service discovery component, a change management component, a policy repository, an evaluation and analysis component, a policy distribution component, a monitoring and reporting component, and a security management component.

16. The method of claim 1, wherein processing the results comprises of converting format of the received result to format used by the federated policy exchange service.

17. The method of claim 1, further comprising the federated policy exchange service converting the requests to a suitably formats to query the one or more the policy providers.

18. The method of claim 1, wherein different ones of the policy providers belong to different policy domains.

* * * * *